US012623097B2

(12) United States Patent
Ngo

(10) Patent No.: US 12,623,097 B2
(45) Date of Patent: May 12, 2026

(54) REUSABLE FACE MASK

(71) Applicant: Air Flo Labs, LLC, Sunnyvale, CA (US)

(72) Inventor: Kevin Ngo, Sunnyvale, CA (US)

(73) Assignee: Air Flo Labs, LLC, Sunnyvale, CA (US)

( * ) Notice: Subject to any disclaimer, the term of this patent is extended or adjusted under 35 U.S.C. 154(b) by 851 days.

(21) Appl. No.: 17/890,003

(22) Filed: Aug. 17, 2022

(65) Prior Publication Data

US 2024/0058631 A1 Feb. 22, 2024

(51) Int. Cl.

| | |
|---|---|
| ***A62B 18/02*** | (2006.01) |
| ***A62B 18/08*** | (2006.01) |
| ***A62B 23/02*** | (2006.01) |

(52) U.S. Cl.
CPC ............ *A62B 18/025* (2013.01); *A62B 18/08* (2013.01); *A62B 18/084* (2013.01); *A62B 23/02* (2013.01)

(58) Field of Classification Search
CPC ....... A62B 18/02; A62B 18/025; A62B 18/08; A62B 18/082; A62B 18/084; A62B 23/02; A62B 23/025
See application file for complete search history.

(56) References Cited

U.S. PATENT DOCUMENTS

| | | | |
|---|---|---|---|
| 2,578,007 A | 12/1951 | Hill | |
| 2,845,926 A | 8/1958 | Hill | |
| 2,845,927 A | 8/1958 | Hill | |
| 3,154,073 A | 10/1964 | Klinger | |
| 3,861,381 A * | 1/1975 | Witman | A62B 23/025 128/206.12 |

(Continued)

FOREIGN PATENT DOCUMENTS

| | | |
|---|---|---|
| CA | 200498 | 8/2022 |
| CN | 211532854 | 9/2020 |

(Continued)

OTHER PUBLICATIONS

Preston Tran, Flo Mask Review, Dec. 16, 2020, Youtube, https://www.youtube.com/watch?v=QloU69eTLW4, All Pages (Year: 2020).*

(Continued)

*Primary Examiner* — Joseph D. Boecker
*Assistant Examiner* — Brian T Khong
(74) *Attorney, Agent, or Firm* — Esplin & Associates, PC

(57) ABSTRACT

A reusable face respirator mask for respiratory protection comprising a body dimensioned to fit over a portion of a face of a wearer, including a rigid support component and a flexible seal component molded to the rigid support component, a replaceable filtering element sized and configured to removably cover the rigid support component, and a cover configured to removably couple with the rigid support component of the body. The filtering element is used to filter particles and/or pathogens from inhaled and/or exhaled air. A thumb release located on the cover allows the wearer to decouple the cover to accommodate frequent replacement of the filtering element. The flexible seal component is configured to interface with the face of the wearer and deform under moderate pressure to create a substantially airtight seal with the wearer's face.

19 Claims, 16 Drawing Sheets

(56) References Cited

U.S. PATENT DOCUMENTS

| | | | | |
|---|---|---|---|---|
| D786,443 | S | 5/2017 | Blomberg | |
| D807,509 | S | 1/2018 | Moulton | |
| D887,553 | S | 6/2020 | Huberty | |
| 11,285,344 | B2 | 3/2022 | Key | |
| D961,775 | S | 8/2022 | Yoon | |
| D1,012,277 | S | 1/2024 | Rutan | |
| 2015/0013681 | A1 | 1/2015 | Stockhamer | |
| 2018/0008848 | A1* | 1/2018 | Moulton | A41D 13/11 |
| 2020/0391057 | A1* | 12/2020 | Thompson | A62B 18/025 |
| 2022/0241623 | A1* | 8/2022 | Ellison | A62B 23/025 |

FOREIGN PATENT DOCUMENTS

| | | | |
|---|---|---|---|
| CN | 212185220 | 12/2020 | |
| CN | 212629977 | 3/2021 | |
| KR | 3010556710000 | 4/2020 | |
| WO | WO-2010064862 A2 * | 6/2010 | A62B 18/02 |
| WO | WO-2021224734 A1 * | 11/2021 | A62B 18/006 |
| WO | D228909001 | 1/2024 | |

OTHER PUBLICATIONS

DRIVe, Mask Innovation Challenge, Jul. 22, 2021, U.S. Department of Health & Human Services, https://web.archive.org/web/20210722201632/https://drive.hhs.gov/mask_challenge.html, All Pages (Year: 2021).*

Flo Mask, Flo Mask—Reusable Kids Respirator Mask, Aug. 11, 2021, Amazon, https://web.archive.org/web/20210811210421/https://www.amazon.com/Flo-Mask-Respirator-Replacement-Comfortable/dp/B08LYS9WYD, All Pages (Year: 2021).*

English Machine Translation of WO-2010064862-A2 provided by Espacenet (Year: 2010).*

Stephen Holmes, Respiratory mask for children combats growing air issues, Feb. 5, 2021, Develop3D, https://develop3d.com/product-design/respiratory-mask-for-children-combats-growing-air-issues/, All Pages (Year: 2021).*

International Search Report and Written Opinion for PCT Application No. PCT/US2023/28971, mailed Nov. 6, 2023 (9 pages).

"Prescientx Mask", Twitter post, Jul. 15, 2022, document retrieved from URL [https://twitter.com/BarryHunt008/status/1548104286021623808].

"Flo Mask Pro Tutorial" posted by user Flo Mask. Youtube. Posting date: May 13, 2022. Retrieval date: Dec. 13, 2024. Retrieved from internet: https://www.youtube.com/watch?v=UxlBumKalXg (Year: 2022).

* cited by examiner

REUSABLE FACE MASK

TECHNICAL FIELD

The present disclosure relates generally to personal protective equipment. Specifically, the present application relates to reusable respirator masks for respiratory protection.

BACKGROUND

Face masks have now become a more common, everyday item. They are useful in preventing the spread of disease, as well as helping with allergies and respiratory issues. Traditionally, face masks have been worn by workers in industrial settings to reduce the inhalation of particulate matters and by health care workers to reduce the spread of harmful pathogens. More recently, in response to the pandemic caused by the novel Coronavirus ("Coronavirus"), health agencies across the world have recommended that healthcare workers and vulnerable individuals wear respirator masks to avoid the contraction of and reduce the spread of the Coronavirus. Even as the pandemic slows down in some parts of the world, health care workers are expected to continue wearing masks most of the time.

Not all masks provide the same level of protection. For example, simple cloth face masks are a type of personal protective equipment (PPE) worn on the face. Simple cloth masks and coverings do not form a tight seal around wearer's mouth and nose, thereby limiting their ability to protect from germs that may be in the air, since particles can leak in and leak out around the edges. However, these masks still help to slow the spread of airborne viruses because they offer a barrier that helps keep germs and large particle droplets from reaching other people as you talk, cough or sneeze.

By contrast, respirator style masks (another type of PPE) remove contaminants from the air using cartridges, filters or canisters. Most respirator masks include a face seal that seals against the user's face. For example, face seals may include flexible lips, gaskets, cushions, and/or the like that engage in physical contact with the wearer's face to create the seal.

Respirator masks come in a large variety of types and sizes, ranging from cheaper, disposable masks to more costly, reusable masks that include replaceable filtration cartridges or cannisters. However, the respirator masks most commonly used by medical professionals and regular users alike are disposable. As these disposable masks make their way into the environment, they are disposed of in landfills and can pollute waterways. Like other plastics, they can also break down into microplastics, i.e., particles smaller than 5 mm. Furthermore, because disposable respirator masks are discarded after use, public health and other government agencies have struggled with maintaining adequate supply of respirator masks, especially in time of pandemic. Finally, some wearers may find respirator masks uncomfortable because of a seal formed between the face seal of the mask and the user's face.

Therefore, a need exists for a respirator mask that is lightweight, durable, easy to operate, forms a comfortable seal, is inexpensive, and can be reused.

SUMMARY

In accordance with one or more embodiments, a reusable face respirator mask can be provided for respiratory protection. In some embodiments, the mask comprises a body dimensioned to fit over a portion of a face of a wearer, a replaceable filtering element, and a cover. The body includes rigid support component and a flexible seal component molded to the rigid support component. The replaceable filtering element is sized and configured to removably cover the rigid support component. The filtering element is used to filter particles and/or pathogens from inhaled and/or exhaled air. The cover is configured to removably cover the rigid support component. A thumb release located on the cover allows the wearer to decouple the cover to accommodate frequent replacement of the filtering element. The flexible seal component is configured to interface with the face of the wearer and deform under moderate pressure to create a substantially airtight seal with the wearer's face.

In some embodiments, the rigid support component comprises a first material and the flexible seal component comprises a second material that is more flexible than the first material. The replaceable filtering element comprises a woven material.

In some embodiments, the rigid support component is defined by an outer wall surrounding a plurality of concentric inner walls joined by a plurality of interconnecting ribs. The inner walls define a plurality of internal openings. When the mask is worn by the wearer, it forms a cavity around the wearer's face.

In some embodiments, the outer wall of the rigid support component comprises a first complementary mating element, and the inner surface of the cover comprises a second complementary mating element and being configured to mate with one another in a complementary manner and to allow coupling and decoupling of the cover on the body. In some embodiments, the first complementary mating element is a recess, and the second complementary mating element is a protrusion. When the cover removably couples the rigid support component, mating of the cover and the body includes a snap-fit connection.

The rigid support component comprises a set of protective enclosures extending around an outer perimeter thereof configured to secure the filtering element removably covering the filter facing surface. The inner surface of the cover includes a set of complementary channels extending within the inner surface configured to receive the set of enclosures of the rigid support component.

In some embodiments, the cover and the body are configured to mate with one another such that the cover is selectively coupled to the body in a first direction to secure the filtering element between the cover and the body. In some embodiments, the outer surface of the cover comprises a latch configured to accommodate moving the cover in in a second direction opposite the first direction, to allow removal of the cover from the body.

In some embodiments, the cover is decoupled from the body by lifting the latch in a second direction, opposite the first direction, to thereby allow removal of the cushion from the frame.

In some embodiments, the reusable respirator mask includes a condensation insert removably insertable within the cavity. The condensation insert comprises a moisture absorbing material.

In some embodiments, the flexible seal component comprises a side wall and a membrane adapted to seal around the wearer's face. The membrane is connected to the side wall at an outer periphery of the membrane and unconnected at an inner periphery of the membrane. In some embodiments, the membrane comprises a nose bridge engagement portion shaped and sized to seal around a nose bridge of the wearer. In some embodiments, the side wall comprises a pair of recesses areas positioned equitably around the nose bridge engagement portion, the pair of recesses shaped and sized to receive eyeglass worn by the wearer.

In some embodiments, the filter cover comprises a first and second set of anchors configured to receive a head attachment mechanism. The head attachment mechanism comprises a first strap attached to the first set of anchors, and a second strap attached to the second set of anchors, each strap equipped with an adjustment device for accommodating different head sizes and tensioning preferences of the wearer. In some embodiments, the first and second strap comprise elastomeric material.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

As alluded to above, presently existing respirator masks, most commonly used by medical professionals and vulnerable individuals, are not disposable. That is, they do not have refillable filtration mediums and are not suited for disinfection.

While existing reusable respirator masks (e.g., canister style respirator masks) allow for the replacement of filtration cartridges, they are bulky and expensive making such masks less desirable for frequent sue such as during a pandemic. Additionally, when using a disposable respirator mask, wearers may have difficulty achieving a fit that is both relatively comfortable and provides an adequate seal.

That is, some may find that wearing the mask is uncomfortable because of a seal formed between the sealing element of the mask and the face. For example, at least some known face seals exert uneven pressure on the wearer's face such that higher pressure areas (commonly referred to as "hot spots") of the face seal may result in uncomfortable points of contact with the wearer's face.

Described herein are apparatus and/or method(s) for improving reusable respirator masks. The reusable respirator mask, in particular an oronasal mask, includes a body having a flexible seal component comprising a flexible silicone seal molded to a support component composed of more rigid material and configured to receive a disposable filter secured by a filter cover. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

Figure 1:
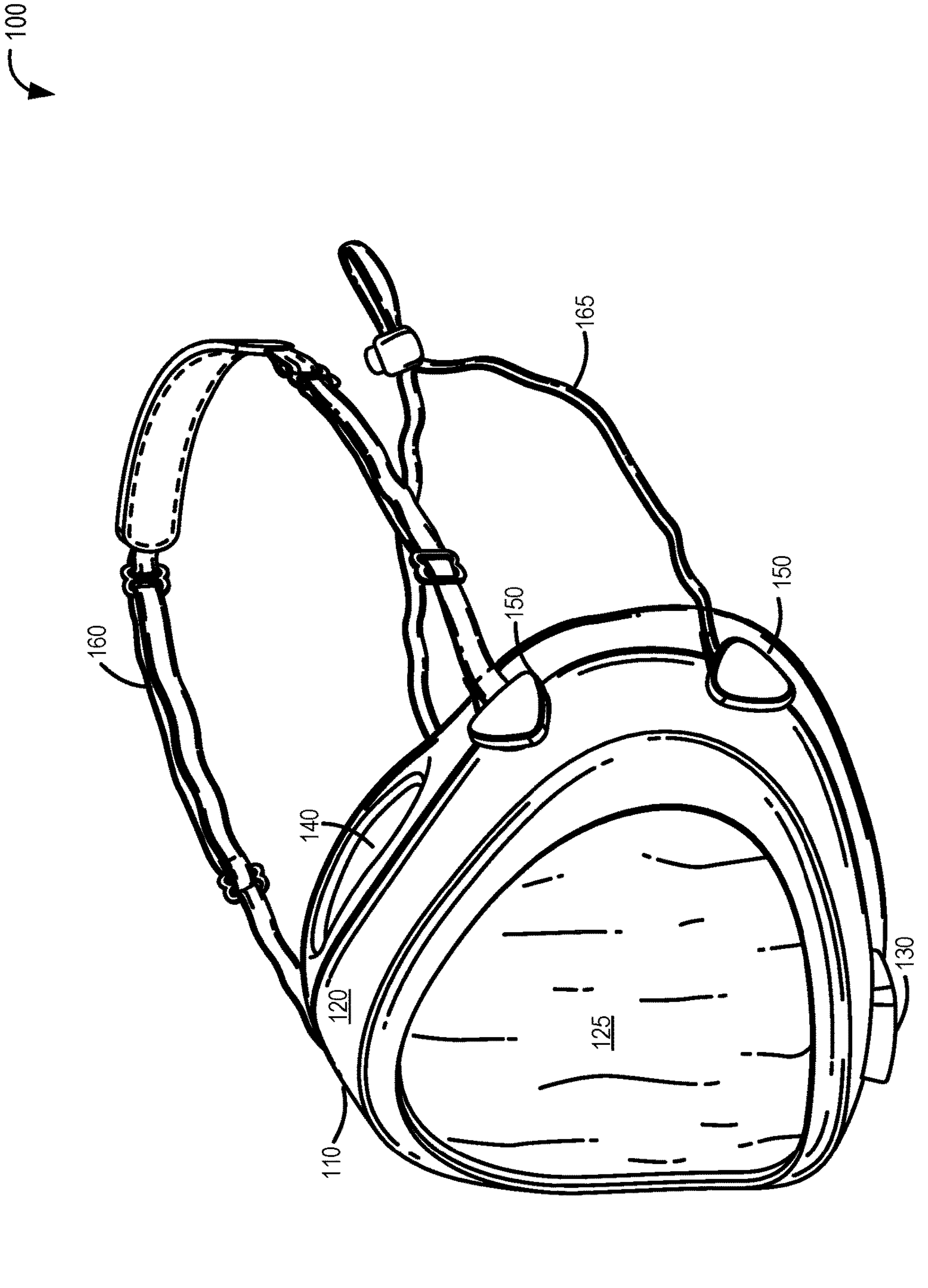
FIG. 1 illustrates a front perspective view of an assembled embodiment of a reusable respirator mask, according to an implementation of the disclosure.
Figure 2A:
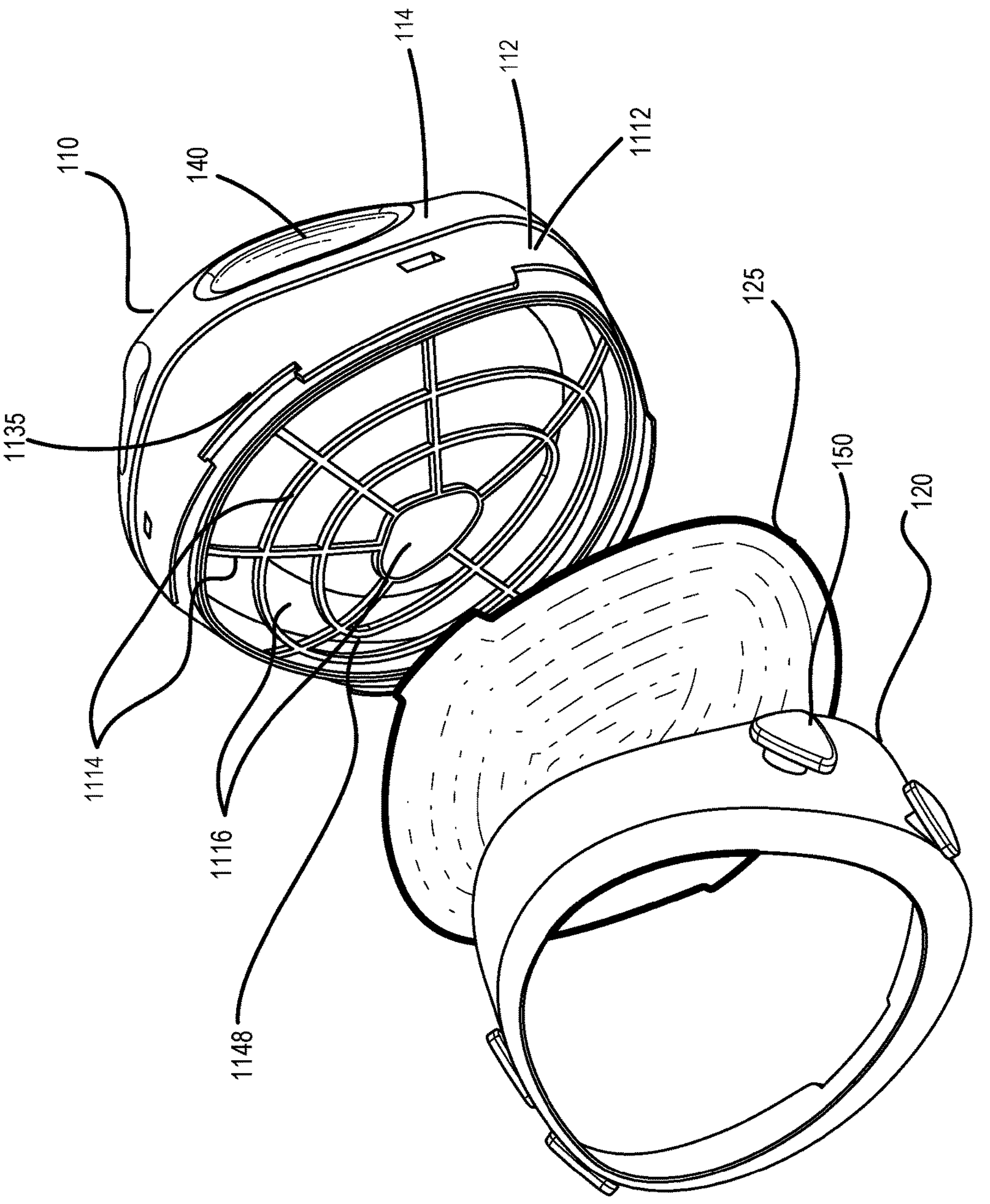
FIG. 2A illustrates an exploded front side view of an embodiment of a reusable respirator mask, according to an implementation of the disclosure.
Figure 2B:
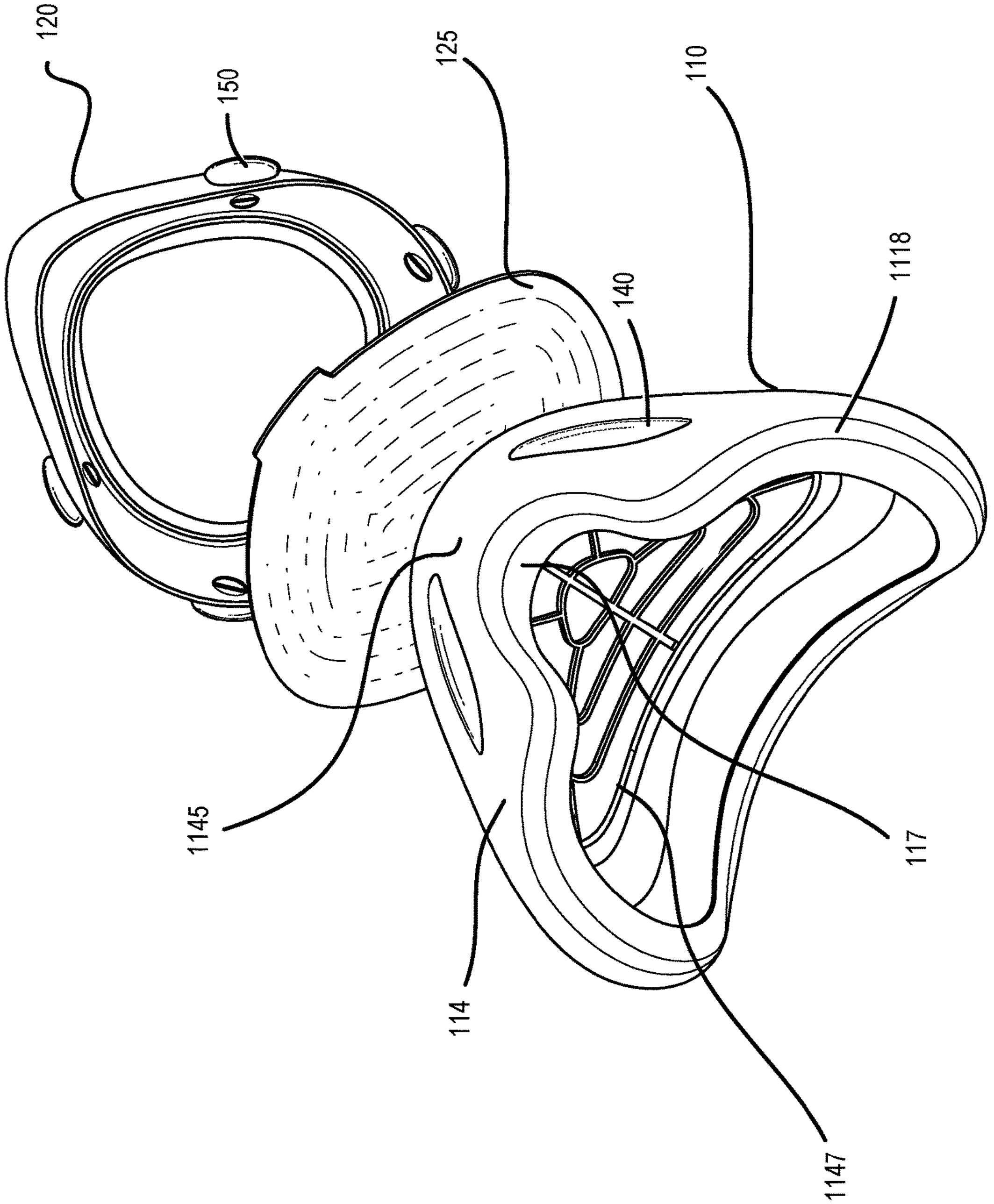
FIG. 2B illustrates an exploded rear side view of an embodiment of a reusable respirator mask, according to an implementation of the disclosure.
Figure 3:
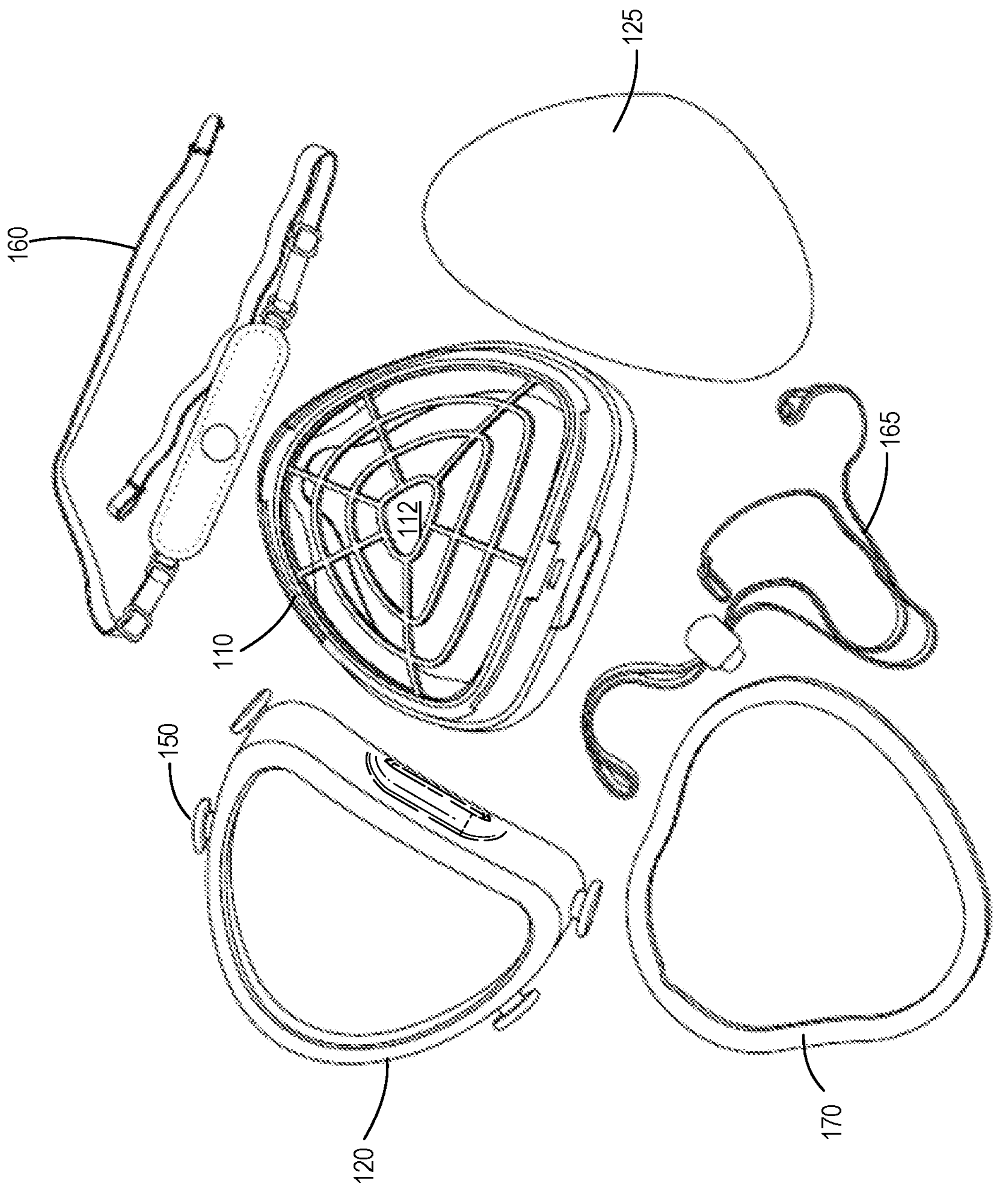
FIG. 3 illustrates a front perspective view of a disassembled reusable respirator mask illustrated in FIGS. 1 and 2, according to an implementation of the disclosure.

Beginning with FIGS. 1-3, a reusable respirator mask 100 is an oronasal mask configured to be worn by an adult wearer in environments where the wearer is exposed to hazardous materials, such as, but not limited to, gases vapors, aerosols (such as dusts, mists, smoke, including that from wildfires, and/or biological agents), and/or the like. The reusable respirator mask may be referred to herein as the mask. The mask comprises a body 110, a removable filter cover 120, a replaceable filter 125, a first fastening strap 160, a second fastening strap 165, and a condensation insert 170 (illustrated in FIG. 3).

Body 110

As illustrated in FIGS. 2A-2B, the body 110 of the mask 100 may include a rigid support component 112 (i.e., the component substantially in contact with the filtering element 125) and a flexible seal component 114 (i.e., the component substantially in contact with the wearer's face, illustrated in FIG. 2B) molded to the rigid support component 112. The rigid support component 112 may comprise two sides, first side 1148, which is facing the environment (e.g., filter), and a second side 1147, which is the opposite of the first side 1148, and is facing the wearer's face.

In the preferred embodiment, the rigid support component 112 and the flexible seal component 114 of body 110 may be constructed from different materials. For example, the rigid support component 112 may be composed of one or more materials that provide the body 110 with at least some support. For example, the material used to construct the rigid support component 112 may include a rigid plastic, such as high-density polyethylene (HDPE), a polycarbonate (e.g., a medical grade polycarbonate), or any other suitable rigid and impact resistant material configured for frequent use. The material of the rigid support component 112 may be suitable to withstand frequent cleaning and sterilization with chemical disinfectants (e.g., aldehydes, oxidants) and hot water, which is necessary to maintain personal hygiene standards, especially during pandemics. Additionally, the material of the rigid support component 112 may withstand impact (e.g., upon being dropped from at 5 ft height) without breaking.

By contrast, the flexible seal component 114 may be composed of one or more materials that provide the body 110 with at least some flexibility and assist in forming an airtight seal when the mask is worn by the wearer. For example, material used to construct the flexible seal component 114 may be include of one or more materials that is flexible and deformable, allowing the flexible seal component 114 to deform under moderate pressure to form a substantially airtight seal with the face of the wearer. Suitable materials may include, but are not limited to, silicone or a silicone-based polymer, rubber, silicone rubber, latex, thermosets, thermoplastic elastomer (TPE), cushioning and/or dampening materials, shape memory materials, and/or the like or other materials that are more flexible than the rigid support component 112.

Additionally, it is advantageous if both materials used to construct the rigid support component 112 and the flexible seal component 114 have properties of moderate heat resistance to allow for body 110 to be cleaned and/or disinfected. For example, mask body 110 may be cleaned using hot water or a sanitizing chemical agent.

By constructing the rigid support component 112 and flexible seal component 114 from different materials, the mask body 110 is able to provide the durability and support (through the more rigid support component 112) as well as the seal-ability and comfort to the wearer (through the more deformable flexible seal component 114).

The mask body 110 (i.e., via the first side 1148 of the rigid support component 112) may be configured to accept a replaceable filtering element and interface with a removable filter cover 120 configured to secure the replaceable filtering element 125. Furthermore, the rigid support component 112 may also be configured to support the replaceable filtering element 125 such that the movement (i.e., sliding) of the filtering element 125 is substantially limited. Finally, the rigid support component 112 may also be configured to allow the air to pass through the wearer's mouth and the outside environment.

Rigid Support Component 112

Figure 4A:
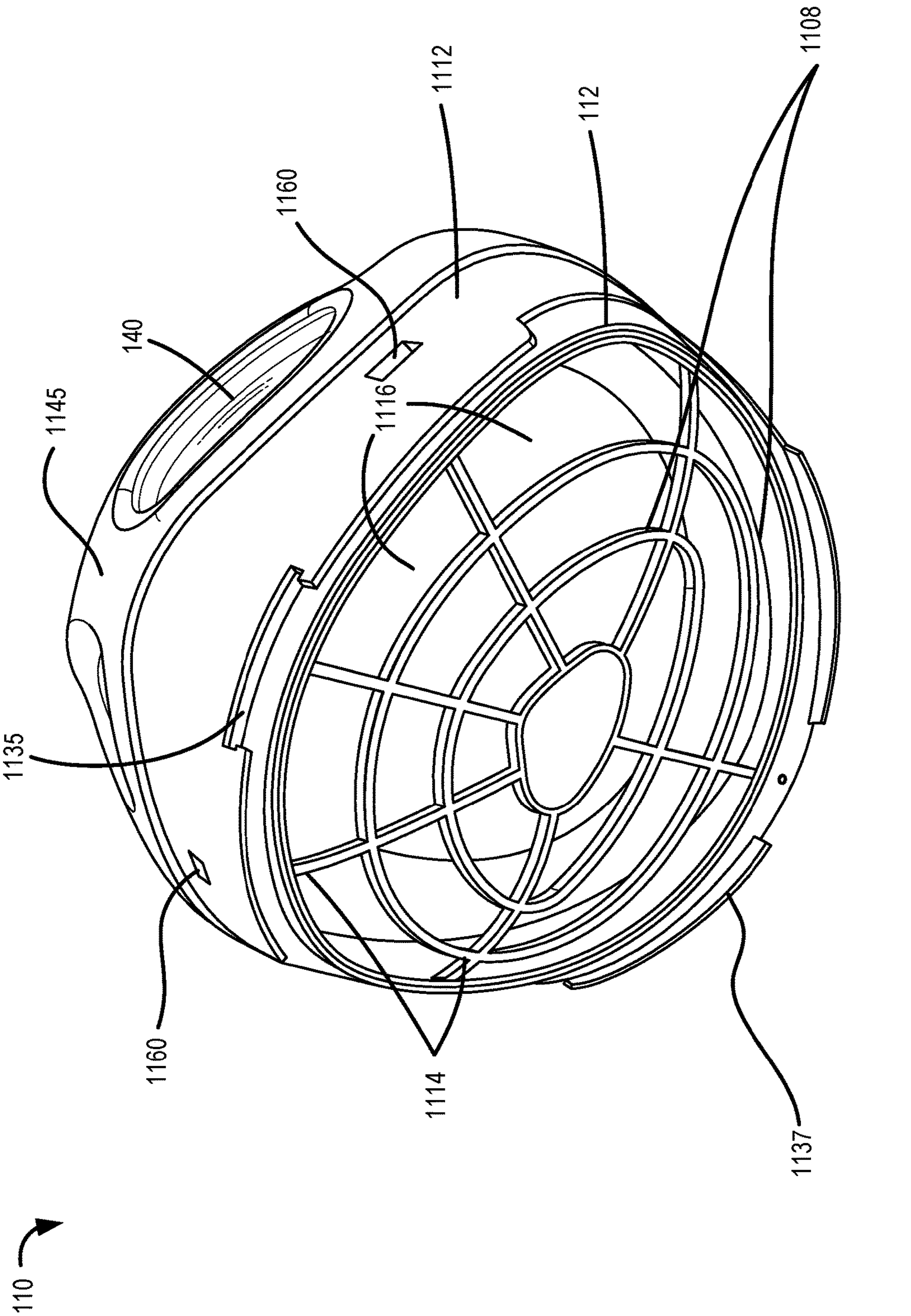
FIGS. 4A-4B illustrate a front perspective view of a body of the reusable respirator mask, according to an implementation of the disclosure.
Figure 4B:
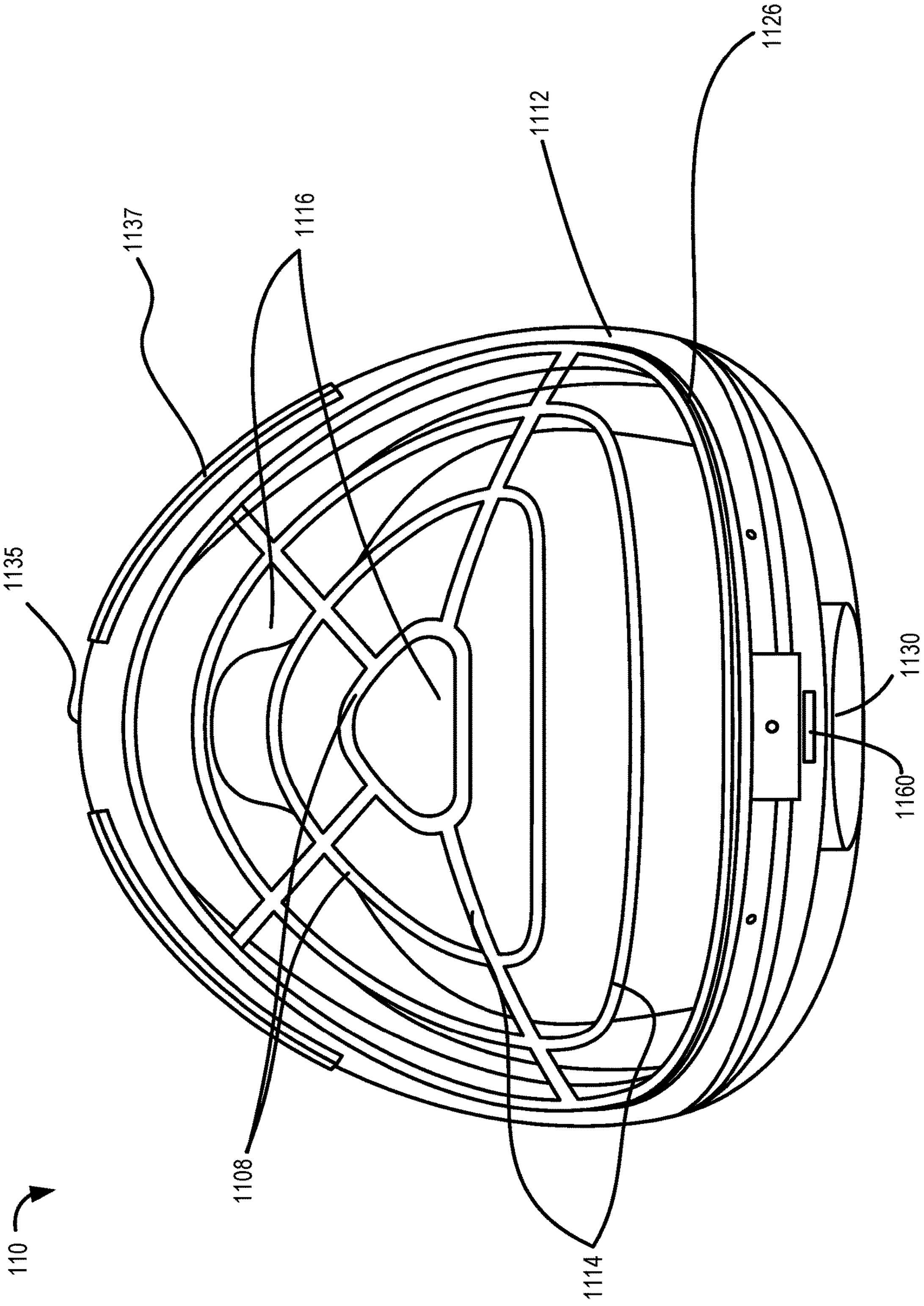

For example, as illustrated in FIGS. 4A-4B, the rigid support component 112 of mask body 110 may comprise a perimeter wall 1112 surrounding a plurality of concentric inner walls 1108 joined by a network of spokes or ribs 1114, extending radially inward from the perimeter wall 1112 and forming a pattern of openings 1116. However, the radial spokes or ribs 1114 may vary in size, shape, and number, or a pattern formed. For example, the pattern may include a spider web pattern or any such similar patterns of openings. The ribs 1114 and inner walls 1108 may be configured to provide support and limit the movement of the replaceable filtering element 125 by exerting frictional forces upon the filtering element 125. For example, the radially extending ribs 1114 and/or inward walls 1108 may be coated with friction-inducting material such as silicone.

Additionally, rigid support component 112 may include a ring 1126 located at the outer edge of the rigid support component 112 defining the area for the placement of the filtering element 125. The ring 1126 may comprise silicone or other similar friction-inducting material. The silicone ring 1126 may assist in guiding the filtering element 125 placement, limiting the movement filtering element 125 as the filter cover 120 is being attached, and contribute to the formation of the seal between the rigid support component 112 of mask body 110 and the filter cover 120 once the cover 120 is coupled.

When coupled with the body 110, the filter cover 120 secures the filtering element 125 placed atop of the rigid support component 112 of the mask body 110. Notably, the silicone rib 1126 further restricts any potential movement of the filtering element 125 by exerting friction forces upon the filtering element 125.

The concentric inner walls 1108 joined by a network of ribs 1114 surrounded by the outer wall 1112 may be configured to give the rigid support component 112 of the mask body 110 a substantially concave shape. The concave shape of the rigid support component 112 formed by concentric inner walls 1108 joined by a plurality of ribs 1114 surrounded by the outer wall 1112 may create a cavity around the wearer's face when the mask 100 is worn and may be characterized by a degree of flexion. In preferred embodiments, substantially all of the contact between the user's face and mask 100 occurs at seal 1118 of the flexible seal component 114. By virtue of using flexible radial ribs 1114, a cavity is formed around the wearer's face. This cavity ensures that contact between the face of the wearer and flexible seal component 114 may be minimal or entirely absent, allowing the wearer to move their mouth more easily, thereby enhancing the user's ability to talk and breathe while wearing the mask 100.

Flexible Seal Component 114

Figure 7A:
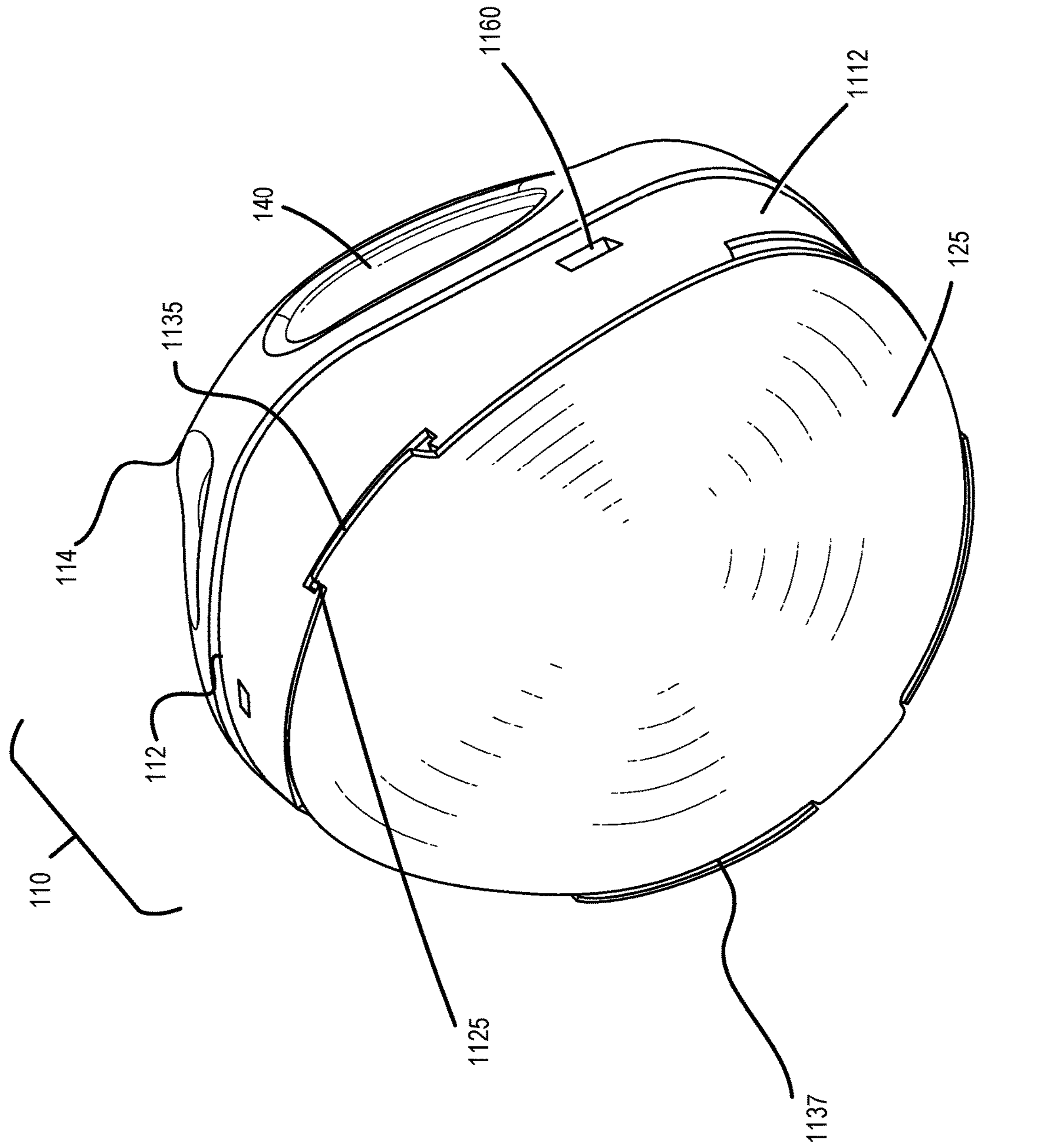
FIGS. 7A-7B illustrates a front and a front perspective view of a body equipped with filter of the reusable respirator mask, according to an implementation of the disclosure.
Figure 7B:
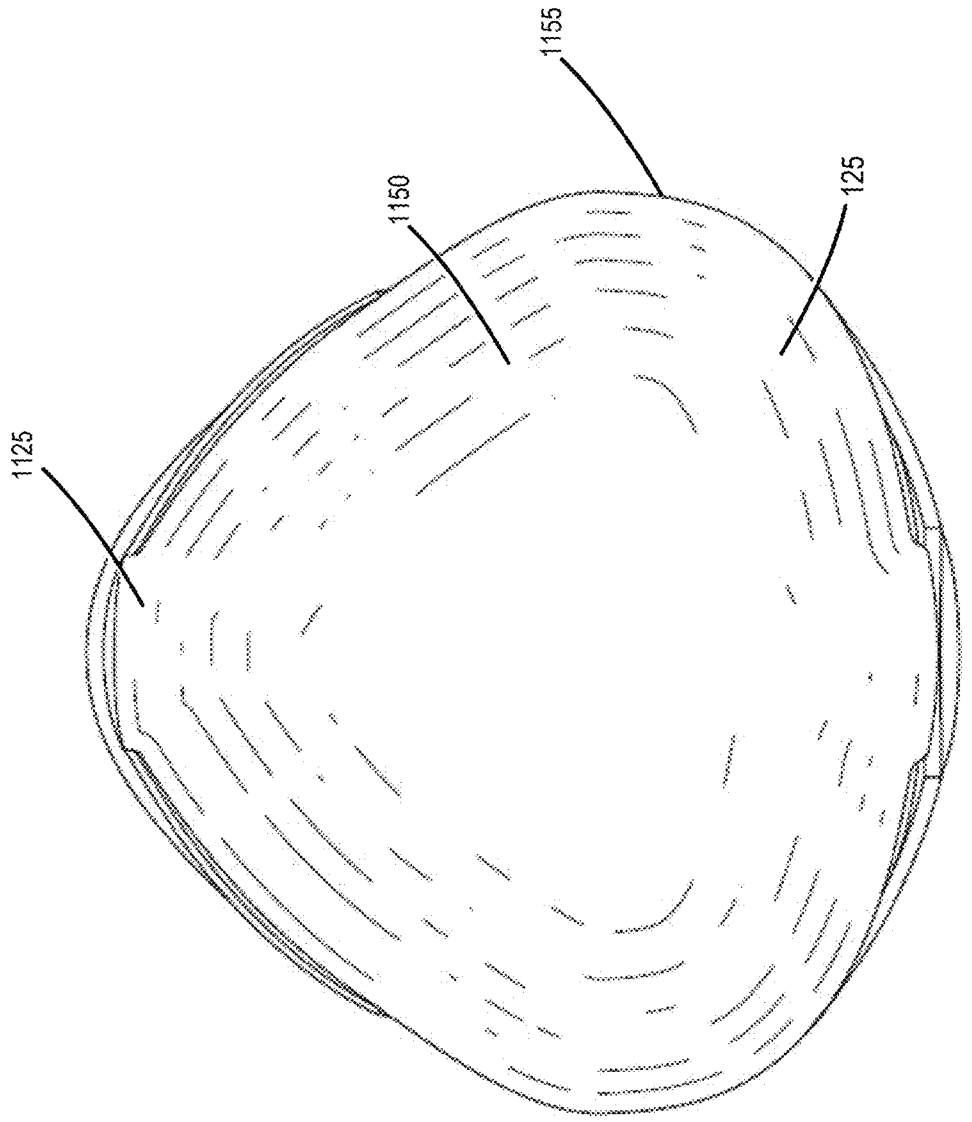
Figure 7C:
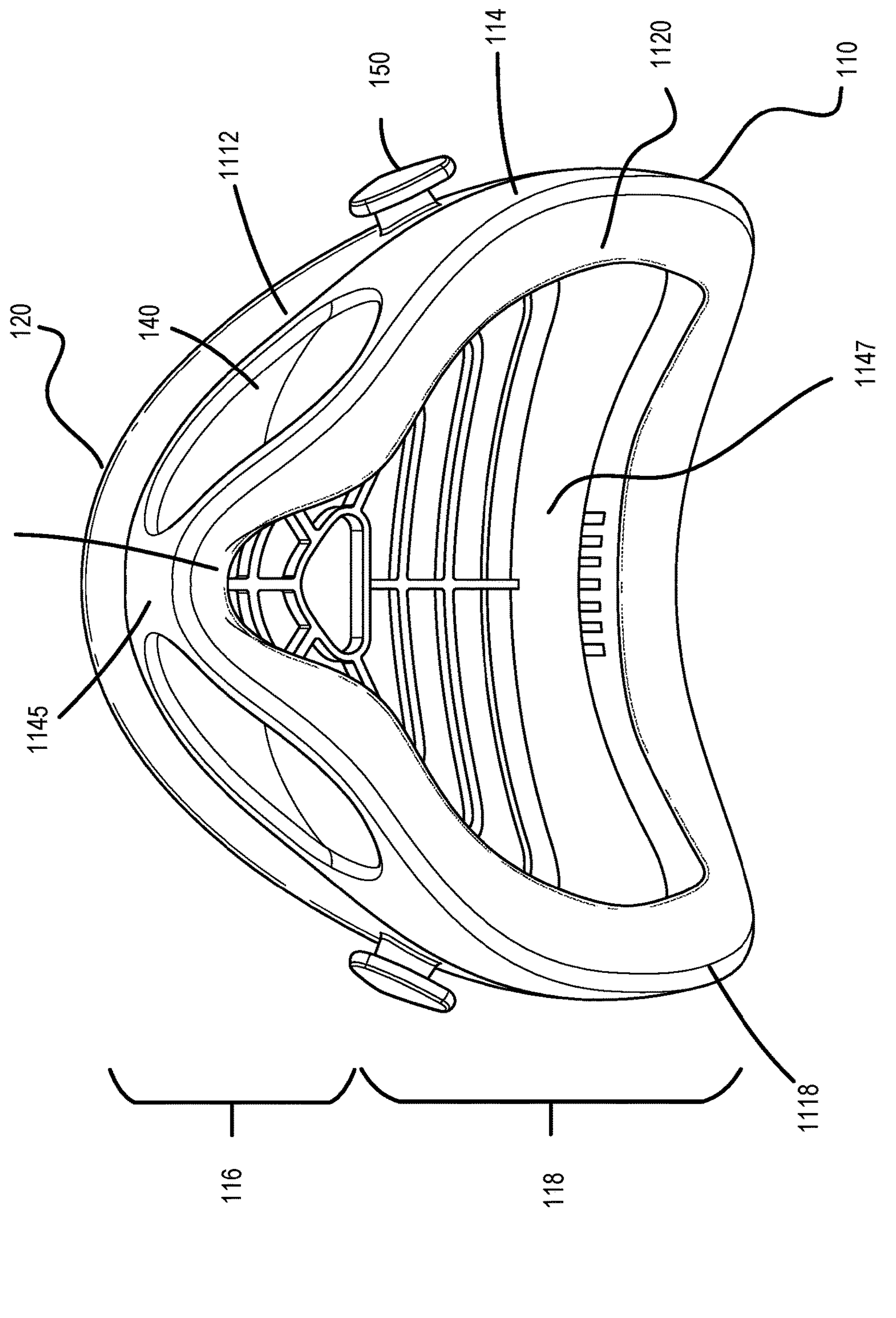
FIG. 7C illustrates a rear perspective view of a filter cover and a body of the reusable respirator mask, according to an implementation of the disclosure.

As illustrated in FIG. 7C, the flexible seal component 114 of the mask body 110 may include an upper face part 116 and a lower face part 118. The upper face part 116 may be configured to cover the wearer's face above the mouth and nose. Conversely, the lower face part 118 may be configured to cover the wearer's face around their mouth. The upper face part 116 of the mask body 110 may include a nose bridge area 117 configured to receive the nose of the wearer therein such that the nose area 117 covers at least a portion of the wearer's nose and at least parts of upper check of the wearer. The lower face part 118 of the mask body 110 is configured to cover the mouth, at least parts of lower cheek, and at least a part of the chin of the wearer.

As alluded to above, the flexible seal component 114 of the mask body 110 may be configured to conform to wearer's face thereby forming an airtight seal. For example, as illustrated in FIG. 7C, flexible seal component 114 of the mask body 110 includes a seal 1118 that is configured to at least partially seal the mask against the wearer's face. The seal 1118 is configured to interface with the face of the wearer and deform under moderate pressure to create a substantially airtight seal with the wearer's face. The seal 1118 is defined by a relatively flexible lip 1120 having a perimeter 1128. The seal 1118 is configured to at least partially seal the flexible seal component 114 of the body 110 to the wearer's face by engaging in physical contact with the wearer's face adjacent the upper face part 116 and the lower face part 118. As illustrated in FIG. 4B, the flexible seal component may comprise an interface 1130 which facilitates decoupling of the filter cover 120 from the body 110, as described further herein. For example, the interface 1130 may comprise a slight indent within the surface of the flexible seal component 114.

Nose Bridge Sizes

Figure 10B:
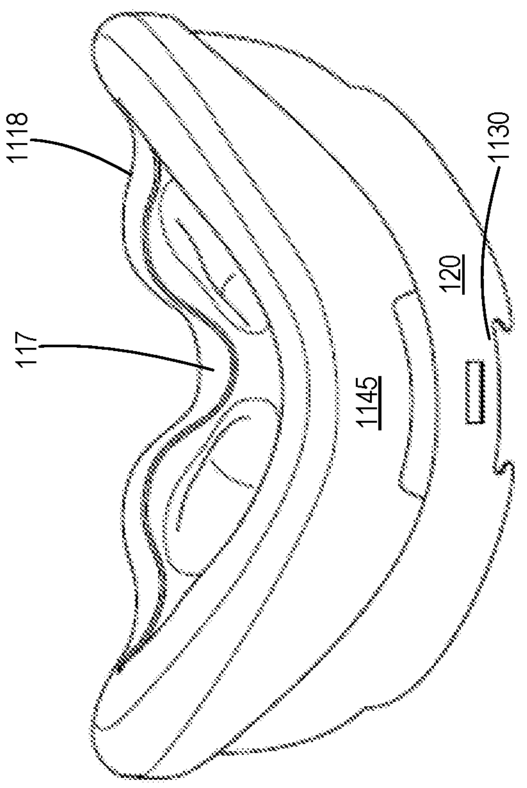
FIG. 10B illustrates a rear perspective bottom view of the first embodiment of the nose bridge illustrated in FIG. 10A, according to an implementation of the disclosure.
Figure 10A:
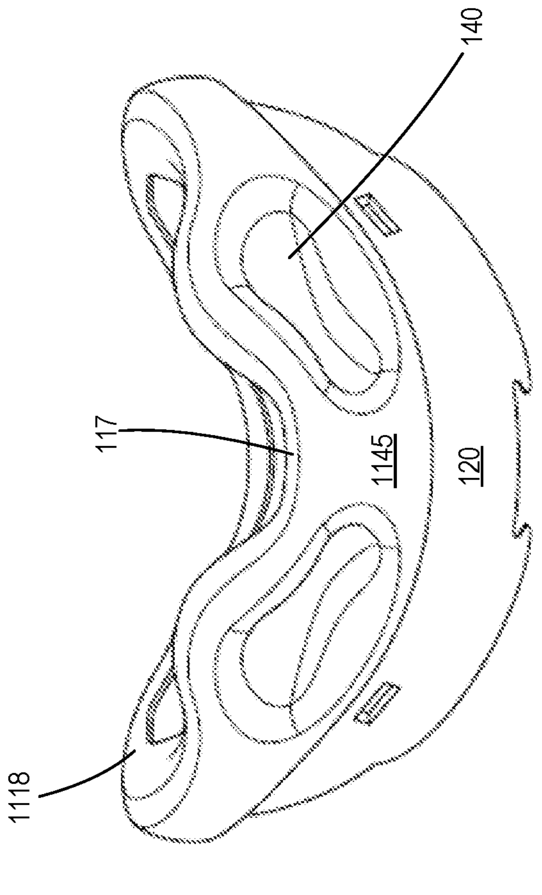
FIG. 10A illustrates a front perspective top view of a first embodiment of a nose bridge of the reusable respirator mask illustrated in FIG. 1, according to an implementation of the disclosure.
Figure 10D:
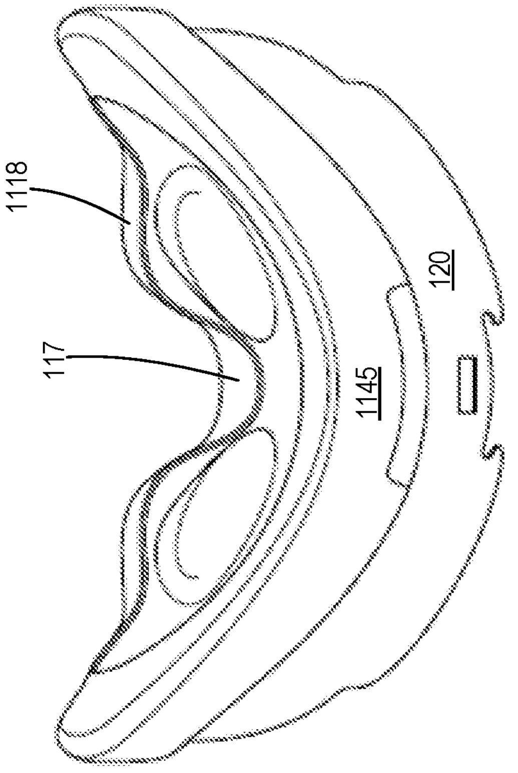
FIG. 10D illustrates a rear perspective bottom view of the second embodiment of the nose bridge illustrated in FIG. 10C, according to an implementation of the disclosure.
Figure 10C:
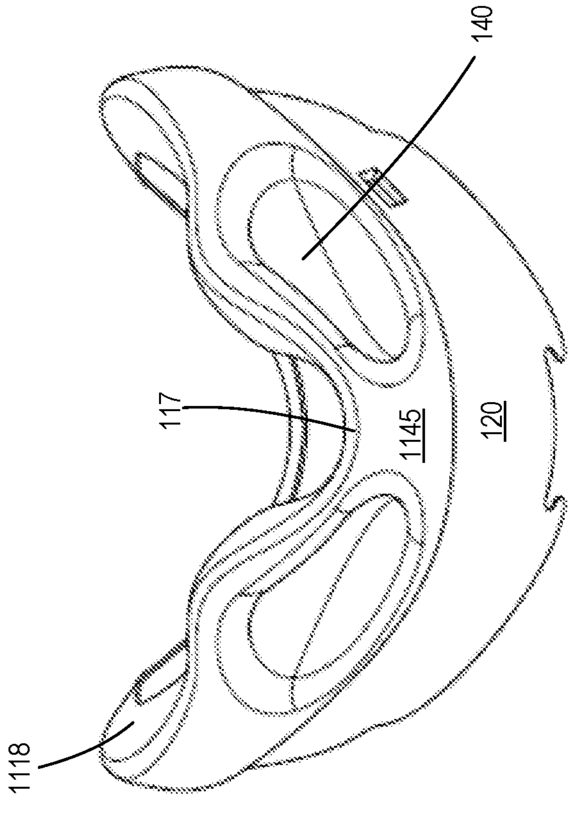
FIG. 10C illustrates a front perspective top view of a second embodiment of the nose bridge of the reusable respirator mask illustrated in FIG. 1, according to an implementation of the disclosure.

In some embodiments, the nose bridge area 117 may be sized to accommodate varying sizes of the nose bridge, for example as illustrated in FIGS. 10A-10D. Varying the size of nose bridge 117 is configured to accommodate varying facial anatomies (e.g., the width and/or projectile the nose) of the wearer. For example, the flexible seal 1118 may conform to some unique anatomical discrepancies of various wearers by virtue of being composed of flexible material capable of stretching while maintaining a substantially airtight seal with the face of the wearer. However, some facial anatomies may be so diverse so as to prevent the flexible seal 1118 from forming a substantially airtight seal with the face of the wearer. Because forming a seal around the wearer's face is essential to the proper functioning of the mask 100, in some embodiments, the mask 100 is configured to have differently sized flexible seal components 114 so as to accommodate more substantial variations in facial anatomy of individual wearers. For example, as illustrated in FIGS. 10A-10B, the nose bridge area 117 of the flexible seal component 114 may be shaped and sized to accommodate a wider nose with a lower nose bridge. By contrast, the nose bridge area 117 of the flexible seal component 114, illustrated in FIGS. 10C-10D may be shaped and sized to accommodate a nose with a narrower width with a higher nose bridge. By providing the wearer with an option to select the body 110 having appropriately sized nose bridge 117 results in higher levels of seal-ability and wearer comfort. Notably, the change in shape and size of the nose bridge area 117 carried by the body 110 component does not affect the size of other components. That is, filter cover 120, filter element 125, fastening straps 160 and 165, and/or condensation insert 170 remain the same. This compartmentalized approach to the reusable face mask reduces the cost to the wearer and lowers overall environmental impact.

Interior Component—Eye Glass Indents 140

As illustrated in FIGS. 4A and 7C, the flexible seal component 114 of the mask body 110 may include a pair of eye glass indents 140 configured to receive a part of the eyeglasses (reading glasses, sunglasses, and so on) worn by the wearer simultaneously with the mask. In the preferred embodiment, the flexible seal component 114 may include a top part 1145. The eye glass indents 140 may be positioned within the top part 1145 of the flexible seal component 114 on each side of the nose area 117. As alluded to above, the flexible seal component 114 may be constructed from a compressible and flexible silicone forming a comfortable seal around the wearers face. The compressibility of the material of the flexible seal component 114 may provide the glass indents 140 with a level of flexibility thereby accommodating various sizes of lens frames and/or other components of the eye glassware that require resting.

Filtering Element 125

Figure 6B:
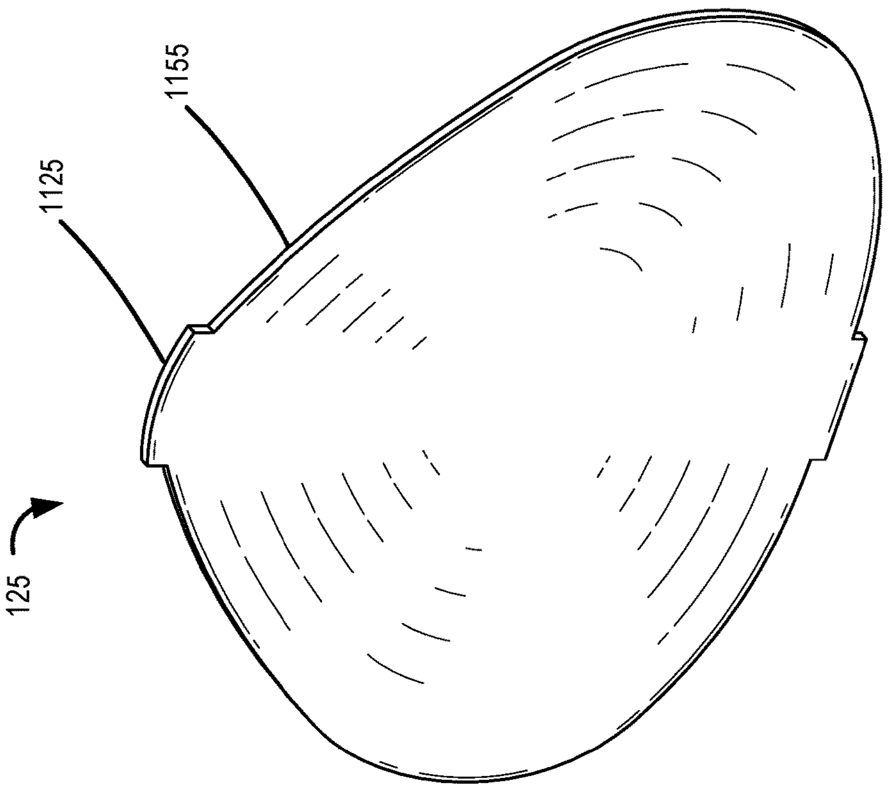
FIGS. 6A-6B illustrate a front and a front perspective view of a filter of the reusable respirator mask, respectively, according to an implementation of the disclosure.
Figure 6A:
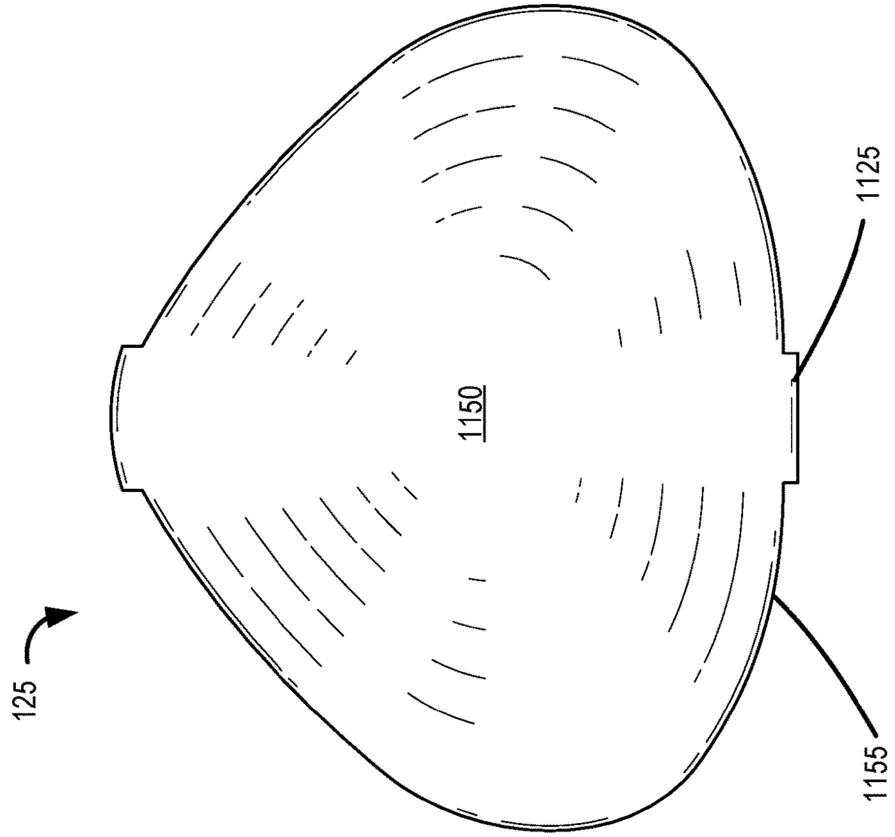

As illustrated in FIGS. 7A-7B, filtering element 125 may be a disposable filter configured to fit between the rigid support component 112 of mask body 110 and the mask cover 120 and used to filter particles and/or pathogens from inhaled and/or exhaled air. In a preferred embodiment, filtering element 125 illustrated in FIGS. 6A-6B comprises a front surface 1150, a rear surface opposite the front surface (not illustrated), a perimeter 1155, and at least one tab 1125 for fitting into the complementary recesses formed at the edge of the rigid support component 112 of mask body 110, as discussed in detail below.

The perimeter 1155 of filtering element 125 is preferably of similar shape and dimensions as the rigid support component 112, such that the perimeter of filtering element 125 may rest within a boundary formed by the perimeter wall 1112 of the rigid support component 112. Filtering element 125 may be removably placed atop of the rigid support component 112 of the mask body 110. The effectiveness of the mask 100 is dependent on the filtering element 125 covering the entirety of the of the rigid support component 112 prior to being secured by the cover 120. When the wearer is wearing the mask over their face, such that the flexible seal component 114 of the mask body 110 conforms to wearer's face and forms an airtight seal, the filtering element 125 and rigid support component 112 are preferably configured so that inhaled air passes through filtering element 125, as opposed to passing through any gaps between filter 125 and rigid support component 112. The gaps may be formed by virtue of sliding of the filtering element 125 during the attachment of the cover 120. To ensure that the air pass through the filtering element 125 rather than any gaps, the filtering elements 125 is configured to be "guarded" by a boundary formed one or more enclosures 1137 at the outer edge of the rigid support component 112 as it meets the perimeter wall 1112 (e.g., illustrated in FIGS. 4A-4B and 7A-7B). The enclosures 1137 may be followed by one or more openings or recesses 1135. As alluded to above, one or more tabs 1125 of the filtering element 125 may be configured to fit into the complementary recesses formed at the edge of the rigid support component 112. The enclosures 1137 may secure the relatively lightweight filtering element 125 from being easily disturbed and moved by the attachment of the cover 120. Accordingly, by virtue of fitting the tabs 1125 within a plurality of recesses 1135 prevents any potential sliding of the filtering element 125 upon attaching the filter cover 120.

Filtering element 125 may be composed of one or more layers of filtration medium. Preferably, filtering element 125 comprises at least a non-woven layer, a meltblown cloth layer, an electrostatically charged layer (e.g., spunbound), a bactericidal, and a hydrophobic layer, which reduces the ability for water to penetrate and wet the filter (e.g., cover-web). The hydrophobic layer may be the topmost layer covering both the front surface 1150 and the rear surface of the filter 125. Various filtration mediums, layering structures, and filtration arrays are known in the art. Such, mediums, layering structures, and filtration arrays may be substituted for or combined with the filtering element 125 to achieve various filtration goals. For example, a bactericidal layer may not be desired if the mask is worn for industrial applications in which pathogens are not a concern.

Filter Cover 120

Figure 5A:
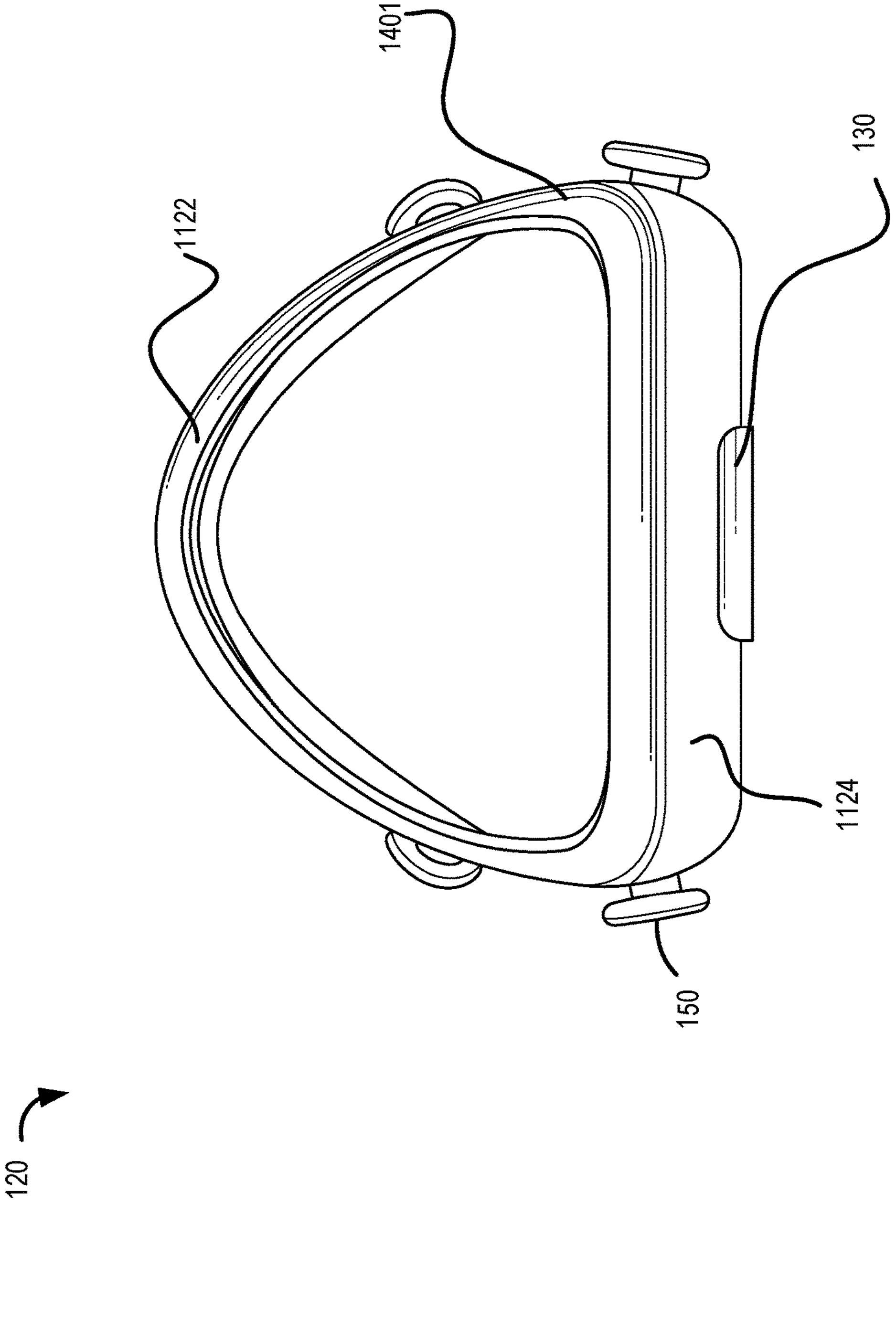
FIG. 5A illustrates a front perspective view of a filter cover of the reusable respirator mask, according to an implementation of the disclosure.
Figure 5B:
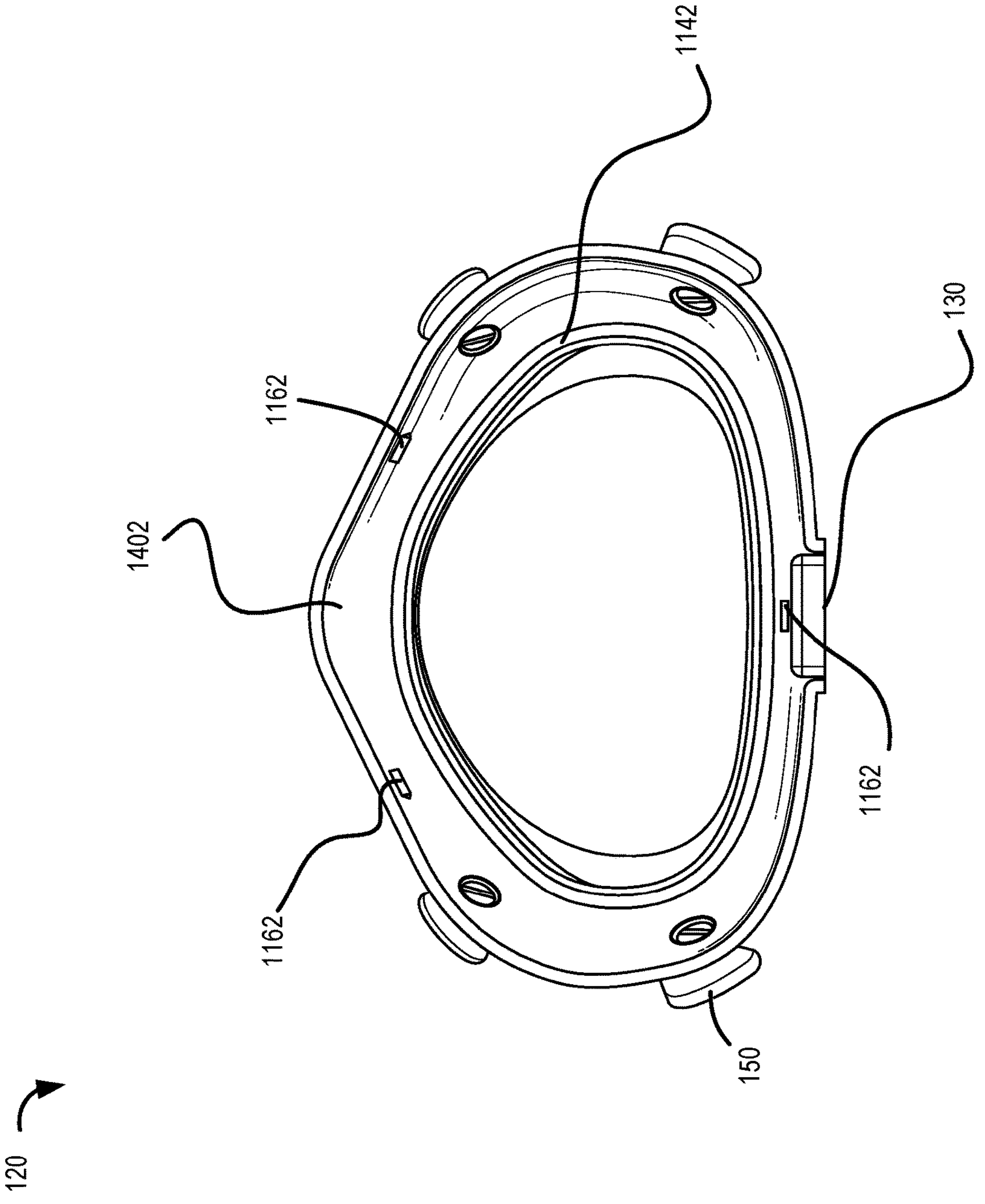
FIG. 5B illustrates a rear perspective view of a filter cover of the reusable respirator mask, according to an implementation of the disclosure.

As alluded to above, the filter cover 120 is configured to secure the replaceable filtering element 125 by virtue of being releasable coupled to the rigid support component 112 of the body 110, as discussed in detail further herein. As illustrated in FIGS. 5A-5B, the filter cover 120 may comprise a rounded frame structure of substantially similar dimensions as the rigid support component 112 of body 110. The filter cover 120 may be composed of one or more materials that provide the filter cover 120 with support and rigidity. For example, material used to construct the filter cover 120 may include a rigid plastic, such as high-density polyethylene (HDPE), a polycarbonate (e.g., a medical grade polycarbonate), or any other suitable rigid and impact resistant material configured for frequent use.

The filter cover 120 may comprise a top face 1122 and a wall 1124. The top face 1122 may define a complementary opening sized and shaped as the filtering element 125 so as to allow to secure the filtering element 125 while keeping substantially most of the filtering element 125 uncovered. The filter cover 120 may secure the filtering element 125 around its periphery between the top face 1122 of the filter cover 120 and the rigid support component 112. By keeping the filtering element 125 substantially uncovered the air to freely pass to and from the wearer's mouth and the outside environment.

The top face 1122 and the wall 1124 may each have an exterior side 1401 (i.e., the side facing the environment) and the interior side 1402 (i.e., the side facing the wearer). As illustrated in FIG. 5A, the exterior of the side wall 1124 of the filter cover 120 may comprise a plurality of anchors 150 used for attaching fastening straps 160 and 165, as will be described further, and a thumb release 130 for moving the cover 120 in an upward motion and allowing decoupling of the cover 120 from the body 110. The interior of the side wall 1124 of the filter cover 120 may include a channel 1142 running along the perimeter of the top face 1122 and configured to engage with a silicon rib 1126 located at the outer edge of the rigid support component 112 (e.g., illustrated in FIGS. 4A-4B and 7A-7B).

As illustrated in FIG. 5B, the interior of the side wall 1124 of the filter cover 120 may comprise a plurality of interfaces 1162 used to engage or mate with complementary interfaces 1160 located within the exterior component of the body 110 (illustrated in FIG. 4A-4B). In some embodiments, interfaces 1160 are shown in FIG. 4A include cylindrical recesses within the outer wall 1112 of the rigid support component 112 though any other suitable shape may be used. Interfaces 1160 are configured to receive a portion of interfaces 1162, shaped and sized to fit within interfaces 1160. Other suitable configurations for mating filter cover notches with interfaces 1160 may include various geometrically shaped recesses, such as stars, squares, or other polygons; or filter cover notches may be protrusions that insert into a portion of interfaces 1160.

Coupling/Decoupling

As alluded to above, the filter cover 120 (e.g., illustrated in FIGS. 5A-5B) is configured to be releasably coupled to the mask body 110 (e.g., illustrated in FIG. 7A). Filter cover 120 may be coupled to body 110 by a variety of mounting members, including screws, bolts, snap-fit connections, or any other suitable form of mounting member as will be apparent to one of ordinary skill in the art in view of the teachings herein. For example, coupling may be formed when the interfaces 1162 within the interior side wall 1124 (e.g., illustrated in FIG. 5B) engage with interfaces 1160 located within the rigid support component 112 (e.g., illustrated in FIGS. 4A-4B) of the body 110. The interfaces 1162 may accept interfaces 1160 a in a "snap-fit" engagement such that the relevant end of the protrusions of interfaces 1160 may be snapped in and out of the recesses of interfaces 1162 without the need for any additional supporting hardware or tools. The engagement between the complementary interfaces 1160 and 1162 allows for the effective and efficient coupling and decoupling of one the filter cover 120 to and from the base 110. Repeated coupling and decoupling results in accommodating frequent replacement of filtering element.

Upon attaching the filter cover 120, the channel 1142 running along the perimeter of the top face 1122 within the interior of the side wall 1124 of the filter cover 120 accepts the silicone rib 1126, located at the outer edge of the rigid support component 112 and, as discussed above, the interfaces 1162 accept the interfaces 1160, resulting in a substantially tight seal formed between the rigid support component 112 of mask body 110 and the filter cover 120.

When coupled with the body 110, the filter cover 120 secures the filtering element 125 placed atop of the rigid support component 112 of the mask body 110. Notably, the silicone rib 1126 further restricts any potential movement of the filtering element 125 by exerting friction forces upon the filtering element 125.

Filter cover 120 and the body 110 may be decoupled by the wearer, for instance, to replace the filtering element 125, to clean and disinfect the components of the mask 100, and/or for any other reason. For example, the filter cover 120 the body 110 may be decoupled by interfacing with recess 1130 of the flexible seal component 114 (e.g., illustrated in 4B) via the thumb release 130. Thumb release 130 may be configured to allow the user to lift the filer cover 120 by sliding their thumb (or any other finger) into a space defined by the recess 1130 and the thumb release 130 and pushing the cover in an upward direction. This motion is configured to lift the filter cover 120 thereby decoupling it from the mask body 110. The force necessary to lift the cover 120 is slight thereby making the decoupling possible using a single digit.

As alluded to above, the interface 1130 may be located within the flexible seal component 114 of the mask body 110 but may be constructed from the material other than the material used for constructing the flexible seal component 114. For example, while the flexible seal component 114 may be composed of a flexible and deformable material, the interface 1130 may be constructed of a more rigid material (similar to that of the rigid support component 112). In other embodiments, the interface 1130 may be constructed from the same or similar material as the flexible seal component 114.

By virtue of the mask body 110 being removably coupled to the filter cover 120, the filter cover 120 may disengage from the body 110 upon impact. For example, when the wearer trips and falls and hits a hard surface, the filter cover 120 may pop off upon impact. Decoupling of the filter cover 120 is designed as a safety feature intended to minimize the impact to the wearer's face caused by the pressure of the hard material of the filter cover 120. Decoupling he filter cover 120 form the mask body 110 reduces the number of parts exerting pressure onto the wearer's face upon impact. Additionally, the basket-like structure of rigid support component 112 formed by the ribs 1114 will act as a kind of protective net configured to cradle wearer's face from impact pressure.

Condensation Insert 170

In some embodiments, a condensation insert 170, for absorbing excess moisture (i.e., condensation) generated by the exhalation of the wearer in certain conditions, may be configured to fit inside the flexible seal component 114 of the body 110 of mask 100. For example, when the temperature of the air being exhaled is substantially different from the temperate of the outside air, a condensate may form inside the mask. The condensate generated by virtue of mixing exhalant with the outside air may pool around the flexible lip 1120 (illustrated in FIGS. 2B and 7C) causing discomfort to the wearer. For example, the silicone material of the flexible lip 1120 may begin to slide around wearer's face when exposed to moisture causing chafing and irritation. Additionally, excessive moisture may compromise the integrity of the seal 1118 formed by flexible lip 1120 thereby minimizing the effectiveness of the mask 100. By placing the condensation insert 170 inside the flexible seal component 114 results in removal of excess moisture which in turn prevents the negative side effects of the condensate pooling inside the mask, described above, and ensures the filtration capabilities are maintained. Furthermore, by configuring the condensation insert 170 as a removable component (rather than making it integral part of the flexible seal component 114, for example) results in additional benefits to the wearer. For example, extended exposure to moisture may reduce the longevity of the inset 170 well before the mask itself. By virtue of replacing the excessively worn insert 170, allows the wearer to effectively extend the usability of the mask in a cost-effective way (i.e., the cost of the insert 170 may be magnitudes lower than that of any other component of the mask). Additionally, exposure to moisture may increase exposure to pathogens within the insert and potentially harm the wearer. However, by virtue of removing and sanitizing the insert 170, provides the wear with a quick way to maintain safety of the mask.

Figure 9B:
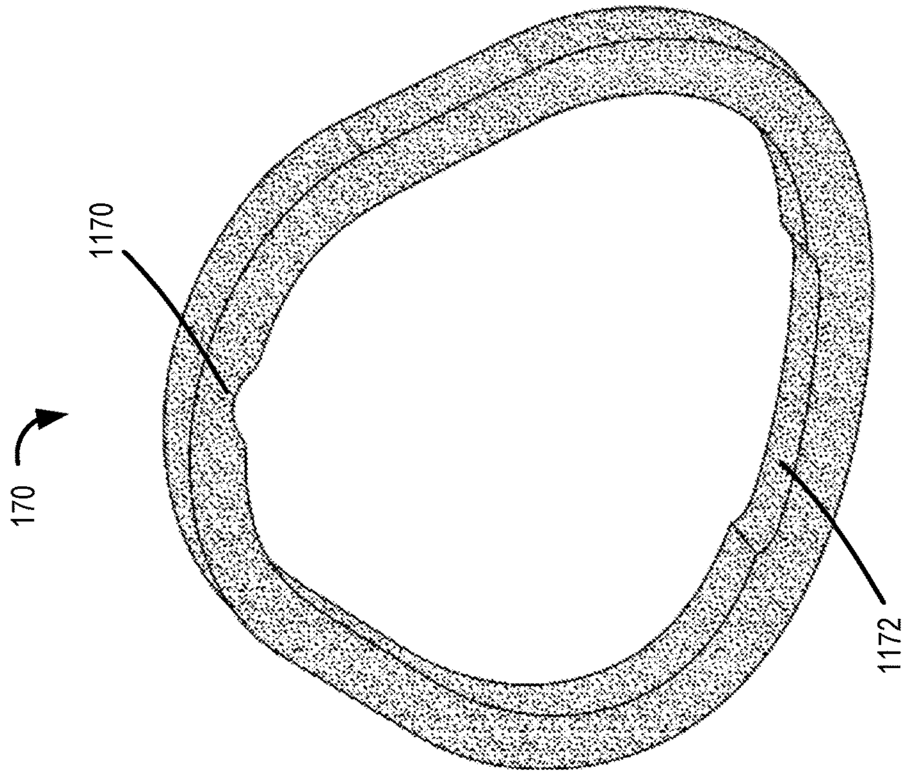
FIGS. 9A-9B illustrate a front and a front perspective view of a condensation insert of the reusable respirator mask, respectively, according to an implementation of the disclosure.
Figure 9A:
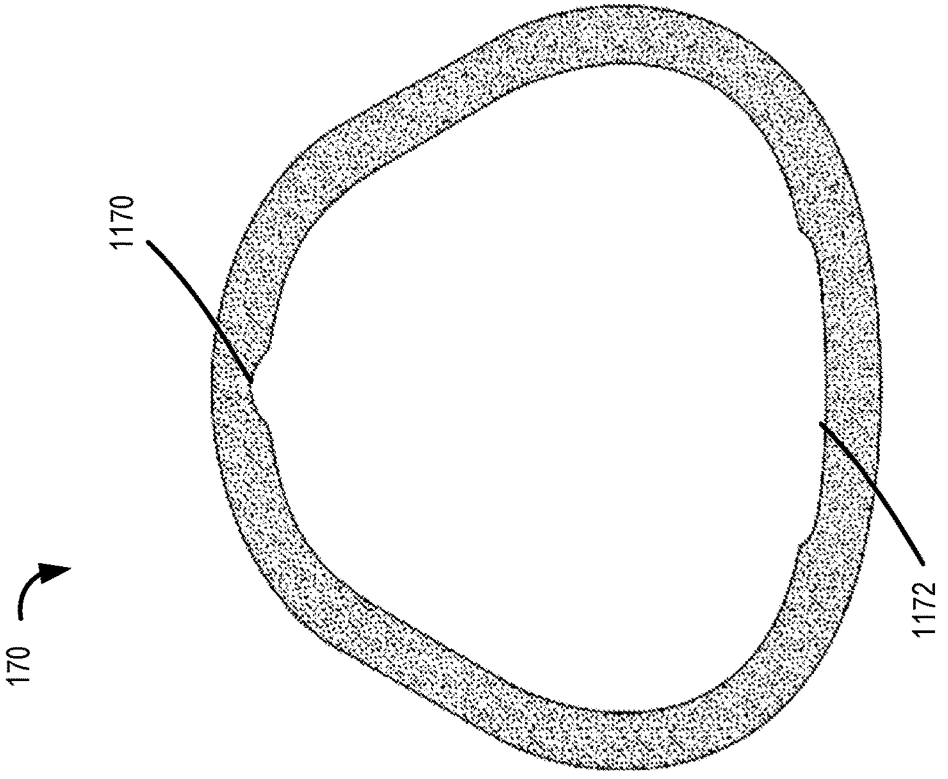

As illustrated in FIGS. 3 and 9A-9B, the condensation insert 170 may comprise a ring-like structure of substantially similar dimensions as the flexible seal component 114 of body 110. The condensation insert 170 may be constructed of material with moisture absorbing properties, including but not limited foam, sponge, nylon, and other such similar moisture absorbing and/or moisture wicking properties.

The condensation insert 170 may comprise a top inset notch 1170 and a bottom insert notch 1172 (illustrated in FIGS. 9A-9B). The top insert notch 1170 may be shorter than then bottom insert notch 1172. The top insert notch 1170 may be configured to provide placement guidance when placing the condensation insert 170 within the flexible seal component 114 along the perimeter 1128 of the flexible lip 1120 (illustrated in FIG. 7C). For example, the method of placing the condensation insert 170 may comprise the wearer grasping the area of the insert 170 around the top notch 1170 of the insert 170 and placing it under the nose bridge area 117 of the upper face part 116 of the flexible seal component 114 of mask body 100, as illustrated in FIG. 7C. Next, the wearer may slide the remaining part of the inset 170 so that it fits within the space along the perimeter 1128 of the flexible lip 1120. The bottom insert notch 1172 may be positioned along the lowest most part of the flexible seal component 114 (i.e., opposite the under the nose bridge area 117). In some embodiments, the bottom insert notch 1172 may provide clearance for the wearer's mouth.

Fastening Straps 160, 165

Figure 8A:
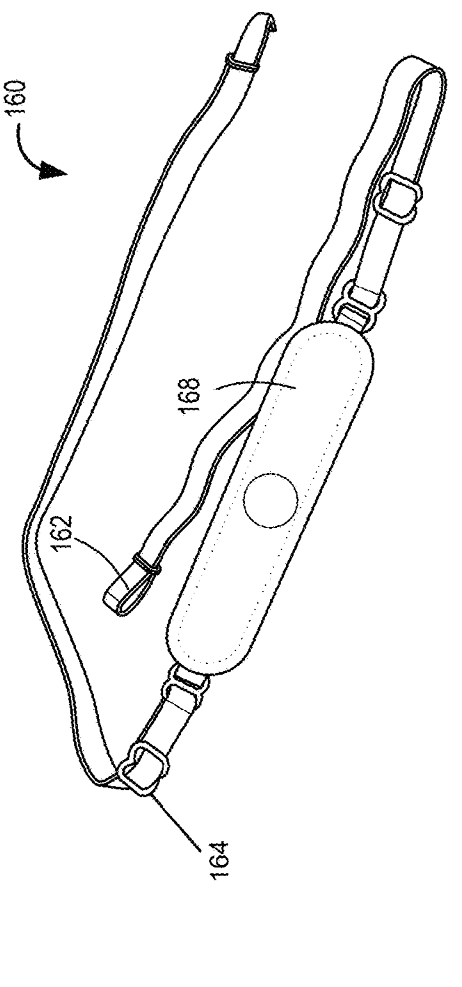
FIGS. 8A-8B illustrates a perspective view of a first and second fastening straps of the reusable respirator mask, according to an implementation of the disclosure.
Figure 8B:
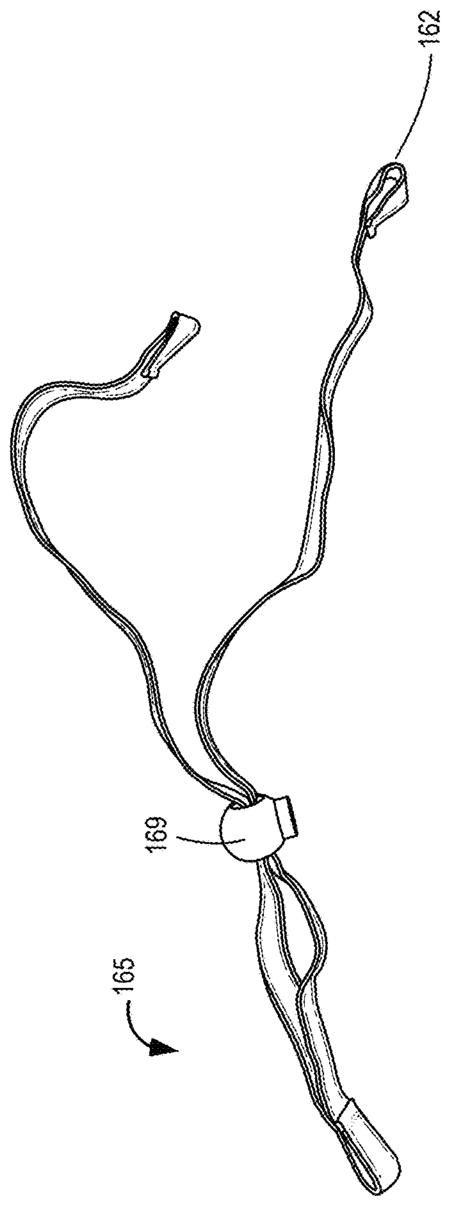

In some embodiments, one or more fastening straps (e.g., a first strap 160 and a second strap 165 illustrated in FIGS. 1 and 8A-8B) may be configured to removable affix the mask to the wearer's head. Each strap 160, 165 may comprise end portions 162 which used to removably couple straps 160, 165 to each anchor 150 positioned on each side of the filter cover 120. End portions 162 may include a loop or any other suitable form of fastening mechanism as will be apparent to one of ordinary skill in the art in view of the teachings herein.

As alluded earlier, a plurality of anchors 150 located on the exterior of the side wall 1124 of the filter cover 120 (illustrated in FIG. 1) may be used as attachment points for fastening straps 160 and 165. The anchors 150 illustrated in FIG. 1 have a rounded triangular face mounted on a cylindrical base smaller in diameter than the face. The triangular shape of the anchors 150 allows to easily attach and remove end portions 162. However, any other suitable shape configured to facilitate coupling and decoupling of the straps may be used. Additionally, the shape and size of the anchors 150 is configured to keep the straps 160, 165 in place, without the risk of inadvertently decoupling. For example, once the looped end portions 162, as illustrated in FIGS. 8A and 8B, are slid over larger triangular faces of each of the anchor 150, the end portions 162 conform to the smaller cylindrical bases and cannot pass over the larger triangular faces of the anchors 150 without assistance from the wearer.

An advantage of connecting straps to filter cover 120 is that the force created by the straps may help maintain the coupling of filter cover 120 to the body 110 while also creating force between the seal 1118 and the face of the wearer. In various embodiments, the straps 160 and 165 may be constructed from a flexible material with elastomeric properties. For example, the material forming the strap 102 may be plastic, rubber, silicone, and/or a material with such similar properties. Alternatively, the material forming the straps 160 and 160 may be woven and/or without any elastomeric properties. In other embodiments, straps 160 and 165 may be connected to mask body 110 rather than filter cover 120. In various embodiments fastening straps 160 and 165 may be approximately 8 millimeters (mm) thick. Fastening straps 160 and 165 may be configured to be adjusted to the size of wearer's head. For example, straps 160 and 165 may each be fitted with a slider 164 for looping straps 160, 165 through the slider 164 to lengthen or shorten the straps 160, 165, when adjusting to heads of varying sizes.

In some embodiments, the first fastening strap 160 may be configured to provide support and further compress the mask to the wearer's face. For example, as illustrated in FIG. 8A, first fastening strap 160 may include a central pad 168. The central pad 168 may be composed of a rubberized material to limit movement of the first fastening strap 160 and prevent its slipping, thereby increasing the compression around the wearer's face. By contrast, the second fastening strap 165 may be equipped with a toggle 169 configured to tighten or, alternatively, loosen the second fastening strap 165, when it is worn around the wear's neck.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration

What is claimed is:

1. A reusable respirator mask with a replaceable filtering element, comprising:

a body dimensioned to fit over a portion of a face of a wearer, the body comprising a rigid support component and a flexible seal component molded to the rigid support component, wherein the rigid support component comprises a filter facing surface and a wearer facing surface, opposite the filter facing surface;

the replaceable filtering element sized and configured to removably cover the filter facing surface of the rigid support component, the replaceable filtering element including a top tab projecting from a perimeter of the replaceable filtering element, and a bottom tab projecting from the perimeter opposite the top tab;

a cover configured to removably couple with the rigid support component, the cover comprising an outer surface and an inner surface, opposite of the outer surface; and wherein an edge of the rigid support component includes a first complementary recess and a second complementary recess, and wherein a covering of the replaceable filtering element over the filter facing surface is based on aligning the top tab with the first complementary recess and the bottom tab with the second complementary recess.

2. The reusable respirator mask of claim 1, wherein the rigid support component comprises a first material and the flexible seal component comprises a second material that is more flexible than the first material.

3. The reusable respirator mask of claim 2, wherein the rigid support component is defined by an outer wall surrounding a plurality of concentric inner walls joined by a plurality of interconnecting ribs, the inner walls defining a plurality of internal openings; and wherein the wearer facing surface forms a cavity around the wearer's face when the mask is worn by the wearer.

4. The reusable respirator mask of claim 3, wherein the outer wall comprises a first complementary mating element, and the inner surface of the cover comprises a second complementary mating element, the first complementary mating element and the second complementary mating element being configured to mate with one another in a complementary manner and to allow coupling and decoupling of the cover on the body.

5. The reusable respirator mask of claim 4, wherein the mating of the cover and the body is a snap-fit connection.

6. The reusable respirator mask of claim 4, wherein the first complementary mating element is a recess, and the second complementary mating element is a protrusion.

7. The reusable respirator mask of claim 4, wherein the cover and the body are configured to mate with one another such that the cover is selectively coupled to the body in a first direction to secure the replaceable filtering element between the cover and the body.

8. The reusable respirator mask of claim 7, wherein the outer surface of the cover comprises a latch configured to accommodate moving the cover in a second direction opposite the first direction, to allow removal of the cover from the body.

9. The reusable respirator mask of claim 7, wherein the cover is configured to be decoupled from the body by lifting a latch in a second direction, opposite the first direction.

10. The reusable respirator mask of claim 4, wherein the flexible seal component comprises a side wall and a membrane adapted to seal around the wearer's face, the membrane being connected to the side wall at an outer periphery of the membrane and being unconnected at an inner periphery of the membrane.

11. The reusable respirator mask of claim 10, wherein the membrane comprises a nose bridge engagement portion shaped and sized to seal around a nose bridge of the wearer.

12. The reusable respirator mask of claim 11, wherein the side wall comprises a pair of recesses each positioned a same distance from a center of the nose bridge engagement portion, the pair of recesses shaped and sized to receive eyeglasses worn by the wearer.

13. The reusable respirator mask of claim 3, further comprising a condensation insert removably insertable within the cavity.

14. The reusable respirator mask of claim 13, wherein the condensation insert comprises a moisture absorbing material.

15. The reusable respirator mask of claim 1, wherein the rigid support component comprises a set of protective enclosures extending around an outer perimeter thereof, the set of protective enclosures configured to secure the replaceable filtering element removably covering the filter facing surface, and the inner surface of the cover includes a set of complementary channels extending within the inner surface, the set of complementary channels of the cover receiving the set of protective enclosures of the rigid support component.

16. The reusable respirator mask of claim 1, wherein the cover comprises a first set of anchors and a second set of anchors configured to receive a head attachment mechanism.

17. The reusable respirator mask of claim 16, wherein the head attachment mechanism comprises a first strap attached to the first set of anchors, and a second strap attached to the second set of anchors, each strap equipped with an adjustment device for accommodating different head sizes and tensioning preferences of the wearer.

18. The reusable respirator mask of claim 17, wherein the first strap and the second strap comprise elastomeric material.

19. The reusable respirator mask of claim 1, wherein the replaceable filtering element comprises a woven material.

* * * * *